United States Patent [19]

Labes et al.

[11] Patent Number: 4,460,492

[45] Date of Patent: Jul. 17, 1984

[54] LOW VISCOSITY LYOTROPIC CHOLESTERIC LIQUID CRYSTAL COMPOSITIONS

[75] Inventors: Mortimer M. Labes; Heewon Lee, both of Philadelphia, Pa.

[73] Assignee: Temple University, Philadelphia, Pa.

[21] Appl. No.: 322,937

[22] Filed: Nov. 19, 1981

[51] Int. Cl.$^3$ .............................................. C09K 3/34
[52] U.S. Cl. ............................ 252/299.6; 252/299.01; 252/299.7
[58] Field of Search .............. 252/299.6, 299.01, 299.7

[56] References Cited

U.S. PATENT DOCUMENTS

| Re. 28,806 | 5/1976 | Saeva et al. | 252/299.01 |
|---|---|---|---|
| 3,806,230 | 4/1974 | Haas | 252/299.01 |

OTHER PUBLICATIONS

Hartshorne, et al., "Mesomorphism . . . ", 1973, pp. 343–368, Mol. Crys. Liq. Crys., vol. 23.
Gray, et al., Liquid Crystals & Plastic Crystals, vol. 1, pp. 29–31.
Lee, et al., "Lyotropic . . . ," Mol. Cryst. Liq. Cryst., 1982, vol. 84, pp. 137–157.
Goldfarb, et al., "Orientational . . . ", Mol. Cryst. Liq. Cryst., 1982, vol. 87, pp. 259–279.
Lee, et al., "Lyotropic . . . Blue Phase", Mol. Cryst. Liq. Cryst., vol. 82, pp. 355–359.
Goldfarb, et al., "Determination. . . ," Mol. Cryst. Liq. Cryst., vol. 82, pp. 119–135.
Lee, et al., "Phase . . . ", Mol. Cryst. Liq. Cryst., 1983, vol. 91, pp. 53–58.
Lee, et al., "Observation . . . ", Mol. Cryst. Liq. Cryst., 1982, vol. 82, pp. 199–204.
Yu, et al., "Deuteron . . . ", Mol. Cryst. Liq. Cryst., 1982, vol. 80, pp. 129–134.

Primary Examiner—Teddy S. Gron
Assistant Examiner—Catherine S. Kilby
Attorney, Agent, or Firm—Ratner & Prestia

[57] ABSTRACT

A low viscosity, short pitch, cholesteric liquid crystal composition consisting of an alkali cromoglycate dissolved in water or water with a polar solvent, together with an optically active solute in sufficient concentration to render the cromoglycate cholesteric. Suitable compositions will reflect light in the visible spectrum and may be magnetically, electrically, or thermally addressed to produce optical effects therein.

11 Claims, No Drawings

LOW VISCOSITY LYOTROPIC CHOLESTERIC LIQUID CRYSTAL COMPOSITIONS

This invention was made with government support under NSF Grant Nos. DMR-77-07811 and DMR-81-07142. The government has certain rights in this invention.

INTRODUCTION

This invention pertains to cholesteric liquid crystal compositions and particularly to a low viscosity lyotropic form thereof.

It is generally known that nematic liquid crystal compositions can be made cholesteric by adding optically active (chiral) solutes. It is also known that some compounds in solution form nematic liquid crystal phases. These are referred to as lyotropic nematic liquid crystals. Some work has been done to produce cholesteric lyotropic liquid crystals by the inclusion of chiral, or optically active, solutes in such compositions. Typically, such lyotropic liquid crystals require a relatively high concentration of the optically active solute, however, in the solvent. Such compositions therefore are highly viscous. (See, for example, J. Maeno, 87 *Chemical Abstracts* 144000u.)

Thus, cholesteric lyotropic liquid crystal compositions heretofore known have not been practically useful, in the manner of other cholesteric liquid crystals, wherein iridescent colors in the visible spectrum are observed.

To the extent others have experimented in this area (so far as is known), they have been able only to speculate that there may exist cholesteric lyotropic systems of sufficiently short pitch to reflect in the visible range. (See, for example, "Cholesteric States of Micellar Solutions"—Radley and Saupe, Molecular Physics, 1978, Vol. 35, No. 5, 1405–1412, and particularly the last sentence thereof.)

It is therefore a general object of the present invention to provide cholesteric lyotropic liquid crystal compositions of low viscosity and sufficiently short pitch to reflect in the visible part of the electromagnetic spectrum.

It is a particular object of the present invention to provide such compositions useful, in the manner of prior thermotropic cholesterics, in electrooptic devices, magnetooptic devices, temprature indicators, surface mapping of temperature, and/or chemical contamination, and other like applications.

BRIEF DESCRIPTION OF THE INVENTION

Briefly, the present invention comprises a low viscosity cholesteric liquid crystal composition consisting of a alkali cromoglycate dissolved, in a waterbased polar solvent, together with a soluble optically active solute in sufficient concentration to render the cromoglycate cholesteric. Preferably, the solution comprises 7–27%, by weight, of disodium cromoglycate in water or water mixed with other polar solvents and 5–30% of chiral solutes.

DETAILED DESCRIPTION OF THE INVENTION

For a better understanding of the present invention, reference may be made to the following detailed description thereof, taken in conjunction with the appended claims. Further description may also be found in the publication, presently submitted to *Molecular Crystals and Liquid Crystals,* by Heewon Lee and M. M. Labes, entitled "Lyotropic Cholesteric and Nematic Phases of Disodium Cromoglycate in Magnetic Fields," a copy of which, in preprint form, is submitted with this application and is otherwise incorporated herein by reference, with the publication name, volume number, page number, and date to be inserted later herein by amendment.

The compositions of the present invention include alkali cromoglycate compounds of the general class disclosed in British Pat. No. 1,144,906, German Offenlegungsschrift No. 2,704,776, U.S. Pat. 4,132,464, French Pat. No. 2,304,359, and Japanese patent publication No. 7,794,882. Such compounds have otherwise been reported to be lyotropic liquid crystals. The compositions of this invention comprise an alkali cromoglycate, such as disodium cromoglycate, dissolved at relatively low concentrations in a polar solvent, such as water, or a mixture of water with another polar solvent, such as an alcohol, glycol, dimethylformamide, dimethylsulfoxide, dioxane, and acetonitrile, or combinations thereof. In general, the alkali cromoglycate may comprise any such cromoglycate and may include as the alkali cations thereof any one or a combination of sodium, potassium, cesium, lithium, rubidium, or ammonium. Other variants of the cromoglycate moiety also may form liquid crystal compositions at relatively low concentration.

For purposes of the present invention, it is important that the cromoglycate be fully miscible in the polar solvent. Likewise, the chiral solute must be fully soluble in the composition and all of the constituents of the composition must remain in a liquid phase.

Unlike other known lyotropic nematic liquid crystals, the cromoglycate salts referred to herein form a liquid crystal phase in relatively low solute concentrations and therefore generally in low viscosity solutions.

In accordance with the present invention, it has been found that such compositions can be rendered cholesteric by the inclusion therein of a chiral modifier. Preferably, this modifier consists of additives soluble in the solution in a concentration of about 5–30 weight % and present in amounts, within that range, sufficient to render the cromoglycate cholesteric, with sufficiently short pitch to reflect an iridescent color in the visible part of the spectrum. Such additives may consist of l-amino acids and the enantiomers or optical isomers thereof, di- and tripeptides (polyamino acids), alkali salts of optically active malic, mandelic, tartaric acids, steroids, such as deoxycholic acid, sugars, alkali salts of d- or l-branched chain alkyl sulfates, such as sodium-2-octylsufate, alkali salts of d- or l-branched chain alkyl carboxylic acids, such as sodium-2-methylpentanoate, and other like compounds.

Chirality may also be imparted to the cromoglycate liquid crystal molecule itself by substituent addition or molecular rearrangement, such as a chemical modification rendering the salt non-symmetrical.

In general, substantially any cromoglycate liquid crystal composition which forms a low viscosity liquid crystal at relatively low solute concentration, is considered susceptible to modification to form cholesteric compositions, in accordance with the present invention. Such compositions should be addressable to produce visible changes at room temperature, i.e., to reflect light in the visible spectrum, and therefore useful in the manner of prior thermotropic cholesterics, in electrooptic devices, magnetooptic devices, temperature indicators, surface mapping of temperature, and/or chemical contamination, and other like applications. For such purposes, these compositions may be magnetically, elctrically, or thermally addressed to produce optical effects therein.

Those skilled in the art may select such additives and the necessary concentration thereof as may be found appropriate for specific compositions. To date, the compositions which have been rendered cholesteric, with various degrees of effectiveness in producing short pitch visible optical effects, are disodium chromoglycate in water solution (7–27 weight % DSCG) with chiral additives including sodium mandelate, sodium-2-methylpentanoate, D-glucose, L-(+)-arabinose, D-(+)-galactose, D-(+)-mannose, proline, alanine, phenylalanine, lysine HCl, trans-4-hydroxy proline and alanylalanine. Other chiral additives which have also been found relatively effective include sodium malate and sodium-2-octylsulfate, sodium-2-menthoxyacetate, lactose, histidine HCl, aspartic acid, and serine. Combinations of the foregoing have been found particularly effective. Sodium tartrate has also been tested in the same solution and has been found to be ineffective in producing a visible response cholesteric. Among those which have been found relatively effective, certain of the solutes are considered impractical in the solution studied in that their solubility is limited. These include histidine HCl, aspartic acid and serine.

Following are examples of compositions in which visible effects, namely reflectance in the visible spectrum caused by a short pitch cholesteric liquid crystal structure, have been produced at room temperature.

TABLE I

Short Pitch Chiral Lyotropic Liquid Crystals
(With Combinations of Chiral Solutes)

| Sample % in water | Helix Sense | Pitch[a]/ μ at 21° C. | Colors on Cooling (Crossed Polarizers) °C. |
|---|---|---|---|
| 15.4% DSCG 9.8% l-alanine 4.8% l-lysine.HCl | Right | 6–7 | 32.8° → 27.5° Blue → Red |
| 15.8% DSCG 9.5% d-alanine 5.1% l-lysine.HCl | Left | 3–4 | 34.6° → 25° Blue → Red |
| 15.1% DSCG 9.5% l-alanine 9.5% d-lysine.HCl | Right | <3 | 30.1° → 25.0° Blue → Yellow |
| 15.4% DSCG 9.3% l-alanine 10.8% d-lysine.HCl 10.0 l-proline | Right | <3 | 27.0° → 25.0° Blue → Yellow |
| 17.5% DSCG 17.3% l-proline 6.2% l-alanine 6.2% Na-l-mandelate | Right | 4 | 36.8° → 25° Blue → Yellow |
| 17.5% DSCG 17.3% l-proline 6.2% l-alanine 1% Na-l-mandelate | Right | 6 | 34.3° → 23.5° Blue → Yellow |
| 19.1% DSCG 18.9% l-proline 6.8% l-alanine | Right | 10 | 38.5° → 30.5° Blue → Red |
| 16% DSCG 8% l-lysine.HCl 14% dl-alanine | Left | 7.5 | 30.6° → 20° Blue → Red |
| 16% DSCG 8% l-lysine.HCl 14% d-alanine | Left | 4 | 31.4° → 20° Blue → Red |
| 16% DSCG | Right | 4 | 31.4° → 20° |

TABLE I-continued

Short Pitch Chiral Lyotropic Liquid Crystals
(With Combinations of Chiral Solutes)

| Sample % in water | Helix Sense | Pitch[a]/ μ at 21° C. | Colors on Cooling (Crossed Polarizers) °C. |
|---|---|---|---|
| 8% l-lysine.HCl 14% l-alanine | | | Blue → Red |
| 15% DSCG 23.4% trans-4-hydroxy-l-proline | Right | <3 | 32.8° → 19.8° Blue → Yellow |

[a] As measured from the so-called "fingerprint texture" of cholesterics.

From the foregoing, it can be readily ascertained that the cholesteric lyotropic liquid crystal compositions of this invention are considered significant because they provide the potential for a low viscosity, short pitch lyotropic cholesteric composition. Such a composition, unlike any lyotropic liquid crystal compositions heretofore known should be useful, upon formulation in a suitable structure, in the manner of conventional thermotropic cholesteric liquid crystal compositions.

While this invention has been described with reference to specific embodiments thereof, it is not limited thereto. Indeed, it is to be expected that others skilled in the art may devise various other forms of the compositions within the scope of the present invention and the appended claims are intended to be construed to encompass all such variants.

We claim:

1. A low viscosity cholesteric liquid crystal composition comprising a single phase, low viscosity solution of alkali cromoglycate in a water-based polar solvent, said cromoglycate being in a nematic liquid crystal state, and said solution further including at least one soluble chiral modifier selected from the group consisting of 1-amino acids and the enantiomers or optical isomers thereof and di- and tripeptides (polyamino acids), said modifier being present in an amount sufficient to produce a short pitch cholesteric effect in the visible spectrum.

2. A composition, as recited in claim 1, wherein said solvent is water.

3. A composition, as recited in claim 1, wherein said solvent is a water-glycol mixture.

4. A composition, as recited in claim 1, wherein said solvent comprises water in combination with one or more members from the group consisting of alcohol, glycol, dimethylformamide, dimethylsulfoxide, dioxane, and acetonitrile.

5. A composition, as recited in claim 1, wherein said alkali cromoglycate is sodium cromoglycate.

6. A composition, as recited in claim 5, wherein said solvent is water.

7. A composition, as recited in claim 5, wherein said solvent is a water-glycol mixture.

8. The composition of claim 1, wherein said chiral modifier is selected from the group consisting of trans-4-hydroxyl-1-proline, 1-alanine, 1-lysine-HCl, and 1-proline, and said amount is sufficient to produce a pitch of 10 microns or less.

9. The composition of claim 1, wherein the amount of chiral modifier is sufficient to produce a pitch of 10 microns or less.

10. The composition of claim 9, wherein said amount ranges from 5% to 30%, by weight, based upon the total weight of the composition.

11. A composition as recited in any one of claims 1, 8, 9, 10, 2, 3, 4, 5, 6, and 7, wherein said cromoglycate comprises 7–27%, by weight, of said composition and said modifier(s) comprise 5–30%, by weight, of said composition.

* * * * *